US008883051B2

(12) United States Patent
Qiu et al.

(10) Patent No.: US 8,883,051 B2
(45) Date of Patent: Nov. 11, 2014

(54) METHODS FOR INCREASING THE ION PERMEABILITY OF CONTACT LENSES

(75) Inventors: Yongxing Qiu, Duluth, GA (US); Xinming Qian, Johns Creek, GA (US)

(73) Assignee: Novartis AG, Basel (CH)

(*) Notice: Subject to any disclaimer, the term of this patent is extended or adjusted under 35 U.S.C. 154(b) by 187 days.

(21) Appl. No.: 12/960,612

(22) Filed: Dec. 6, 2010

(65) Prior Publication Data

US 2011/0133350 A1 Jun. 9, 2011

Related U.S. Application Data

(60) Provisional application No. 61/267,233, filed on Dec. 7, 2009.

(51) Int. Cl.
*B29D 11/00* (2006.01)
*G02B 1/04* (2006.01)

(52) U.S. Cl.
CPC ..................................... *G02B 1/043* (2013.01)
USPC .......................................... 264/1.32; 264/1.1

(58) Field of Classification Search
USPC .................................................. 264/1.1, 2.7
See application file for complete search history.

(56) References Cited

U.S. PATENT DOCUMENTS

| | | |
|---|---|---|
| 3,408,429 A | 10/1968 | Wichterle |
| 3,532,679 A | 10/1970 | Steckler |
| 3,639,524 A * | 2/1972 | Seiderman ................ 525/263 |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,312,575 A | 1/1982 | Peyman |
| 4,327,203 A * | 4/1982 | Deichert et al. ............ 526/279 |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,543,398 A | 9/1985 | Bany |
| 4,605,712 A | 8/1986 | Mueller |
| 4,632,844 A | 12/1986 | Yanagihara |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,486,579 A | 1/1996 | Lai |
| 5,508,317 A | 4/1996 | Müller |
| 5,583,463 A | 12/1996 | Merritt |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger |
| 5,962,548 A | 10/1999 | Vanderlaan |
| 5,981,675 A | 11/1999 | Valint, Jr. |
| 6,039,913 A | 3/2000 | Hirt |
| 6,367,929 B1 | 4/2002 | Maiden |
| 6,503,960 B1 * | 1/2003 | Kadziela et al. ................ 522/78 |
| 6,627,124 B1 | 9/2003 | Herbrechtsmeier |
| 6,719,929 B2 | 4/2004 | Winterton |
| 6,762,264 B2 | 7/2004 | Künzler |
| 6,822,016 B2 | 11/2004 | McCabe |
| 6,858,673 B1 | 2/2005 | Sakamoto |
| 7,052,131 B2 * | 5/2006 | McCabe et al. .......... 351/159.33 |
| 7,091,283 B2 | 8/2006 | Müller |
| 7,238,750 B2 | 7/2007 | Müller |
| 7,268,189 B2 | 9/2007 | Müller |
| 7,521,519 B1 | 4/2009 | Hirt |
| 7,858,000 B2 | 12/2010 | Winterton |
| 2004/0002729 A1 * | 1/2004 | Zamore ........................ 606/194 |
| 2005/0148682 A1 * | 7/2005 | Hu et al. ....................... 523/106 |

(Continued)

OTHER PUBLICATIONS

PCT International Search Report dated Feb. 15, 2011, International Application No. PCT/US2010/59021, International Filing Date Dec. 6, 2010.

PCT Written Opinion of the International Searching Authority dated Feb. 15, 2011, International Application No. PCT/US2010/59021, International Filing Date Dec. 6, 2010.

* cited by examiner

*Primary Examiner* — Amjad Abraham
(74) *Attorney, Agent, or Firm* — Jian Zhou

(57) ABSTRACT

Described herein are methods for increasing the ion permeability of a silicone hydrogel contact lens by adding a small amount of an ion-permeability-enhancing ("IP-enhancing") hydrophilic vinylic monomer or macromer into a lens-forming material for cast-molding silicone hydrogel contact lenses, while not altering significantly the water content and/or the oxygen permeability of resultant lenses from the lens-forming material.

9 Claims, No Drawings

(56) References Cited

U.S. PATENT DOCUMENTS

| | | |
|---|---|---|
| 2005/0239952 A1* | 10/2005 | Attarwala et al. ............ 524/556 |
| 2006/0004165 A1* | 1/2006 | Phelan et al. ................. 526/279 |
| 2008/0015315 A1* | 1/2008 | Chang et al. ............... 525/326.9 |
| 2008/0143003 A1 | 6/2008 | Phelan |
| 2008/0143958 A1* | 6/2008 | Medina et al. ............ 351/160 H |
| 2008/0174035 A1 | 7/2008 | Winterton |
| 2008/0214687 A1* | 9/2008 | Muller et al. ................... 521/54 |
| 2008/0231798 A1 | 9/2008 | Zhou |
| 2008/0234457 A1 | 9/2008 | Zhou |
| 2009/0093604 A1* | 4/2009 | Schlueter ..................... 526/320 |
| 2010/0296049 A1 | 11/2010 | Justynska |
| 2010/0298446 A1 | 11/2010 | Chang |

METHODS FOR INCREASING THE ION PERMEABILITY OF CONTACT LENSES

This application claims the benefit under 35 U.S.C. §119 (e) of U.S. provisional application Ser. No. 61/267,233 filed Dec. 7, 2009, herein incorporated by reference in its entirety.

This invention is related to a method for making silicone hydrogel contact lenses with increased ion permeability.

BACKGROUND

In recent years, soft silicone hydrogel contact lenses have become more and more popular because of their high oxygen permeability and comfort. By having a high oxygen permeability, a silicone hydrogel contact lens allows sufficient oxygen to permeate through the lens to the cornea with minimal adverse effects on corneal health. In addition to high oxygen permeability, on-eye movement of the lens is also required to ensure good tear exchange, and ultimately, to ensure good corneal health. Ion permeability is one of the predictors of on-eye movement, because the permeability of ions is believed to be directly proportional to the permeability of water. The methods described herein produce ophthalmic lenses having improved ion permeability without adversely affecting other properties of the lens.

SUMMARY

Described herein are methods for increasing the ion permeability of an ophthalmic lens by adding a small amount of an ion-permeability-enhancing ("IP-enhancing") hydrophilic vinylic monomer or macromer into a lens-forming material for cast-molding silicone hydrogel contact lenses, wherein the IP-enhancing vinylic monomer or macromer is a polyethylene glycol methacrylate.

In accordance with the invention, a lens is obtained by curing the lens-forming material in a mold to form the lens and removing the lens from the mold. The resultant lens has an increased ion permeability compared to a control lens produced from a lens-forming material having identical composition except without the IP-enhancing vinylic monomer or macromer of the formula I. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the ophthalmic lenses and methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a monomer" includes mixtures of two or more such monomers, and the like.

"Optional" or "optionally" means that the subsequently described event or circumstance can or cannot occur, and that the description includes instances where the event or circumstance occurs and instances where it does not. For example, the phrase "optional tinting agent" means that the tinting agent can or cannot be present.

Unless defined otherwise, all technical and scientific terms used herein have the same meaning as commonly understood by one of ordinary skill in the art to which this invention belongs. As employed throughout the disclosure, the following terms, unless otherwise indicated, shall be understood to have the following meanings.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "amino group" as used herein has the formula —NRR', where R and R' are, independently, hydrogen, an alkyl group, or an aryl group.

The term "alkylene" as used herein refers to a divalent radical of hydrocarbon.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus. The cycloalkyl group can be substituted or unsubstituted. The cycloalkyl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aryl" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "alkylene oxide" as used herein is a group composed of one or more repeat units having the formula —$(R^a)_n$O—, where $R^a$ is a linear or branched $C_1$-$C_4$-alkylene and n is from 1 to 10.

The term "alkylene amine" as used herein is a group composed of one or more repeat units having the formula —$(R^a)_n$NR—, where $R^a$ is a linear or branched $C_1$-$C_4$-alkylene, n is from 1 to 10, and R is hydrogen, an alkyl group, or an aryl group.

The term "carbonyl" as used herein is a group or molecule composed of a C=O group. The carbonyl group can be present as an aldehyde, ketone, ester, anhydride, or carboxylic acid group.

The term "dicarbonyl" as used herein is a group or molecule composed of two C=O groups. Each carbonyl group, independently, can be present as an aldehyde, ketone, ester, anhydride, or carboxylic acid group.

The term "silicon group" as used herein is a group or molecule composed of at least one silicon atom. The silicon group can be substituted with one or more alkyl groups, where the alkyl groups can be the same or different.

A "hydrogel" refers to a polymeric material that can absorb at least 10 percent by weight of water when it is fully hydrated. A hydrogel material can be obtained by polymerization or copolymerization of at least one hydrophilic monomer in the presence of or in the absence of additional monomers and/or macromers or by crosslinking of a prepolymer.

A "silicone hydrogel" refers to a hydrogel obtained by copolymerization of a polymerizable composition comprising at least one silicone-containing vinylic monomer or at least one silicone-containing macromer or a silicone-containing prepolymer.

"Hydrophilic," as used herein, describes a material or portion thereof that will more readily associate with water than with lipids.

The term "fluid" as used herein indicates that a material is capable of flowing like a liquid.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g., gamma ray or X-ray irradiation), microwave irradiation, and the like. Thermal curing or actinic curing methods are well-known to a person skilled in the art.

A "monomer" means a low molecular weight compound that can be polymerized actinically, thermally, or chemically. Low molecular weight typically means average molecular weights less than 700 Daltons.

A "vinylic monomer," as used herein, refers to a low molecular weight compound that has an ethylenically unsaturated group and can be polymerized actinically, chemically or thermally. Low molecular weight typically means average molecular weights less than 700 Daltons.

The term "olefinically unsaturated group" is employed herein in a broad sense and is intended to encompass any groups containing at least one >C═C< group. Exemplary ethylenically unsaturated groups include without limitation acryloyl, methacryloyl, allyl, vinyl, styrenyl, or other C═C containing groups.

A "hydrophilic vinylic monomer," as used herein, refers to a vinylic monomer that is capable of forming a homopolymer that is water soluble or can absorb at least 10 percent by weight water when fully hydrated.

A "macromer" refers to a medium to high molecular weight compound or polymer that contains functional groups capable of undergoing further polymerizing/crosslinking reactions. Medium and high molecular weight typically means average molecular weights greater than 700 Daltons. In one aspect, the macromer contains ethylenically unsaturated groups and can be polymerized actinically or thermally.

A "prepolymer" refers to a starting polymer that can be cured (e.g., crosslinked and/or polymerized) actinically or thermally or chemically to obtain a crosslinked and/or polymerized polymer having a molecular weight much higher than the starting polymer. An "actinically-crosslinkable prepolymer" refers to a starting polymer which can be crosslinked upon actinic radiation or heating to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

A "photoinitiator" refers to a chemical that initiates radical crosslinking and/or polymerizing reaction by the use of light. Suitable photoinitiators include, without limitation, benzoin methyl ether, diethoxyacetophenone, a benzoyl phosphine oxide, 1-hydroxycyclohexyl phenyl ketone, Darocure® types, and Irgacure® types such as Darocure® 1173, and Irgacure® 2959.

"Thermal initiator" refers to a chemical that initiates radical crosslinking and/or polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. In some aspects, the thermal initiator is azobisisobutyronitrile (AIBN).

"Tinting agent," as used herein includes, but is not limited to, a dye or a pigment that can be incorporated into the lens or lens forming material.

An "antimicrobial agent" refers to a chemical that is capable of decreasing or eliminating or inhibiting the growth of microorganisms such as that term is known in the art.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application No. 60/811,949 (herein incorporated by reference in its entirety), and LbL coating. A preferred class of surface treatment processes is plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

"Ophthalmic lens," as used herein, refers to a lens used on or about the eye or the ocular vicinity. Examples of ophthalmic lenses include, but are not limited to, contact lens (hard or soft), an intraocular lens, a corneal onlay, or other lenses that are used on or about the eye or the ocular vicinity.

"Contact lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically a contact lens has an anterior surface and an opposite posterior surface and a circumferential edge where the anterior and posterior surfaces are tapered off.

"Water content" is the percentage by weight of water in a contact lens when it is fully hydrated. The water content (%)

of contact lenses is measured using an ATAGO CL-1 Refractometer or an ATAGO N2-E Refractometer.

The intrinsic "oxygen permeability" (Dk) of a material is the rate at which oxygen will pass through a material. In accordance with the invention, the term "oxygen permeability (Dk)" in reference to a material or a contact lens means an apparent oxygen permeability which is measured with a sample (film or lens) of 90 or 100 microns in average thickness over the area being measured according to a coulometric method described in Examples. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The "ion permeability" through a lens correlates with the Ionoflux Diffusion Coefficient, D (in units of [$mm^2$/min]), which is determined by applying Fick's law as follows:

$$D = -n'/(A \times dc/dx)$$

where n'=rate of ion transport [mol/min]; A=area of lens exposed [$mm^2$]; dc=concentration difference [mol/L]; dx=thickness of lens [mm].

Described herein are methods for increasing the ion permeability of an ophthalmic lens. The invention is partly based on unexpected discovery that by adding a small percentage of an IP-enhancing vinylic monomer or macromer into silicone hydrogel lens formulations, the ion permeability of resultant silicone hydrogel contact lenses can be increased significantly while the water content and the oxygen permeability of the lenses are not significantly changed, i.e., the changes in water content or oxygen permeability (Dk) is less than about 8% relative to control (change in water content over the water content of the control lens or change in Dk over the Dk value of the control lens).

In one aspect, the method for increasing the ion permeability of a silicone hydrogel contact lens comprises:
a. introducing into a mold a lens-forming material, wherein the lens-forming material comprises (i) at least one silicone-containing vinylic monomer or macromer, (ii) at least one hydrophilic vinylic monomer; and (iii) two polyethylene glycol methacrylates which are different from each other in molecular weight as IP-enhancing vinylic monomers;

wherein the silicone hydrogel contact lens obtained by cast-molding of the lens-forming material with the IP-enhancing vinylic monomers has an increased ion permeability compared to a control lens produced from a control lens-forming material without the IP-enhancing vinylic monomers,
b. curing the lens-forming material to produce the lens; and
c. removing the lens from the mold.

One or more polyethylene glycol methacrylates can be added in the lens forming material to produce a silicone hydrogel contact lens with increased ion permeability. The contact lens has an increased ion permeability compared to the control lens produced from a control formulation without a polyethylene glycol methacrylate (having identical concentrations of all polymerizable components except polyethylene glycol methacrylate). For example, a lens produced from a lens forming material including a polyethylene glycol methacrylate has an ion permeability that is 20%, 30%, 40%, 50%, or 60% greater than the control lens. In one aspect, the ophthalmic lenses produced herein have an Ionoflux Diffusion Coefficient (D) of at least about $1.5 \times 10^{-5}$ $mm^2$/min, preferably at least about $2.5 \times 10^{-5}$ $mm^2$/min, and even more preferably at least about $6.0 \times 10^{-5}$ $mm^2$/min.

In accordance with the invention, the IP-enhancing vinylic monomer or macromer has a hydrophilic group which includes a polyethylene glycol chain. The molecular weight of the hydrophilic group can vary as well. In one aspect, the polyalkylene oxide can have a molecular weight of 100 to 10,000, more preferably 200 to 5,000, and even more preferably 500 to 2,500.

In some aspects, two or more polyethylene glycol methacrylates can be used to produce the lens, wherein the molecular weight of the polyethylene glycol residue for each compound is different. For example, the molecular weight of polyethylene glycol in the first compound is 1,100 and the molecular weight of polyethylene glycol in the second compound is 2,080.

Polyethylene glycol methacrylates can be obtained from commercial sources or can be prepared according to any procedures known to a person skilled in the art. For example, a compound of formula I can be obtained by reacting a monofunctional terminated polyethylene glycol having one first functional group selected from the group consisting of isocyanate, amino, epoxy, hydroxyl, acid chloride, azlactone, and thiol with a vinylic monomer having a second functional group coreactive with the first functional group and selected from the group consisting of isocyanate, amino, epoxy, hydroxyl, acid chloride, azlactone, and thiol group.

Various monofunctional terminated PEGs can be obtained from commercial vendors. Preferred monofunctional-terminated PEGs are those PEGs with one amino, hydroxyl, acid chloride, or epoxy group at one terminus and a methoxy or ethoxy group at the other terminus.

The amount of the polyethylene glycol methacrylate used in the methods described herein can vary depending upon the identity and molecular weight of the hydrophilic group, the lens-forming materials selected, and the desired ion permeability. In one aspect, the amount of the polyethylene glycol methacrylate is up to about 3% by weight, preferably from about 0.5% to about 2.5% by weight in the lens formulation.

The polyethylene glycol methacrylate is polymerized with other lens-forming materials to produce an ophthalmic lens. The lens-forming material can be a polymerizable fluid that includes, for example, a solution, a dispersion, a solvent-free liquid, or a melt at a temperature below 60° C. In some aspects, the lens-forming material includes, but is not limited to, an actinically crosslinkable prepolymer.

Any suitable hydrophilic vinylic monomers can be used herein to make the lenses. Examples of hydrophilic vinylic monomers include, but are not limited to, hydroxyl-substituted lower alkyl ($C_1$ to $C_3$) (meth)acrylates, hydroxyl-substituted lower alkyl vinyl ethers, $C_1$ to $C_3$ alkyl(meth)acrylamide, di-($C_1$-$C_3$ alkyl)(meth)acrylamide, N-vinylpyrrole, N-vinyl-2-pyrrolidone, 2-vinyloxazoline, 2-vinyl-4,4'-dialkyloxazolin-5-one, 2- and 4-vinylpyridine, amino(lower alkyl)-(where the term "amino" also includes quaternary ammonium), mono(lower alkylamino)(lower alkyl) and di(lower alkylamino)(lower alkyl)(meth)acrylates, allyl alcohol, N-vinyl $C_1$ to $C_3$ alkylamide, N-vinyl-N—$C_1$ to $C_3$ alkylamide, and the like.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, N-vinyl formamide, N-vinyl acetamide, N-vinyl isopropylamide, N-vinyl-N-methyl acetamide, allyl alcohol, N-vinyl caprolactam, and mixtures thereof.

Any suitable silicone-containing vinylic monomers or macromers can be used in the invention. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl) acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl] propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, and TRIS, N-[2-hydroxy-3-(3-(t-butyldimethylsilyl)propyloxy)propyl] acrylamide.

A class of preferred silicone-containing vinylic monomers or macromers is polysiloxane-containing vinylic monomers or macromers. A "polysiloxane-containing vinylic monomer or macromer" refers to a vinylic monomer or macromer containing at least one ehtylenically unsaturated group and a divalent radical of

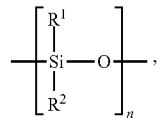

wherein $R^1$ and $R^2$ are, independently, a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-(OCH$_2$CH$_2$)$_m$—OR$^3$, in which alk is $C_1$-$C_6$ alkylene divalent radical, $R^3$ is hydrogen or $C_1$-$C_6$ alkyl, and m is an integer of from 1 to 10; n is an integer of 3 or higher. Examples of such vinylic monomers or macromers include monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl(meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (herein incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example, methacrylate end capped polyethyleneoxide-block-polydimethylsiloxane-block-polyethyleneoxide can be used herein to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Another class of preferred silicone-containing macromers is silicon-containing prepolymers comprising hydrophilic segments and hydrophobic segments. Any suitable silicone-containing prepolymers with hydrophilic segments and hydrophobic segments can be used herein. Examples of such silicone-containing prepolymers include those described in commonly-owned U.S. Pat. Nos. 6,039,913, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Nos. 61/180,449 and 61/180,453; all of which are incorporated herein by references in their entireties.

A lens forming material for making silicone hydrogel lenses can also comprise a hydrophobic monomer. By incorporating a certain amount of hydrophobic vinylic monomer in a lens forming material, the mechanical properties (e.g., modulus of elasticity) of the resultant polymer may be improved. Nearly any hydrophobic vinylic monomer can be used. Examples of preferred hydrophobic vinylic monomers include, but are not limited to, methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, and any combination thereof.

A polymerizable composition for making silicone hydrogel lenses can also comprise one or more crosslinking agents (i.e., compounds with two or more acryl groups or three or more thiol or ene-containing groups and with molecular weight less than 700 Daltons). Examples of preferred cross-linking agents include without limitation tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide,1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis(trimethylsiloxy) disiloxane, 1,3-bis(methacryloxyethylureidopropyl)-1,1,3,3-tetrakis(trimethylsiloxy)disiloxane, and combinations thereof. A preferred cross-linking agent is tetra(ethyleneglycol) diacrylate, tri(ethyleneglycol) diacrylate, ethyleneglycol diacrylate, di(ethyleneglycol) diacrylate, methylenebisacrylamide, triallyl isocyanurate, or triallyl cyanurate. The amount of a cross-linking agent used is expressed in the weight content with respect to the total polymer and is preferably in the range from about 0.05% to about 4%, and more preferably in the range from about 0.1% to about 2%.

It must be understood that a polymerizable composition for making silicone hydrogel lenses can also comprise various components, such as, for example, polymerization initiators (e.g., photoinitiator or thermal initiator), a visibility tinting agent (e.g., dyes, pigments, or mixtures thereof), a polymerizable UV-absorbing agent, a polymerizable latent UV-absorbing agent, antimicrobial agents (e.g., preferably silver nanoparticles), bioactive agent, leachable lubricants, and the like, as known to a person skilled in the art.

Examples of suitable photoinitiators include, but are not limited to, benzoin methyl ether, diethoxyacetophenone, a benzoylphosphine oxide, 1-hydroxycyclohexylphenyl ketone, or Darocure® or Irgacure® types, for example Darocure® 1173 or Irgacure® 2959. Examples of benzoylphosphine initiators include 2,4,6-tri-methylbenzoyldiphenylophosphine oxide, bis-(2,6 dichlorobenzoyl)-4-N-propylphenylphosphine oxide; and bis-(2,6-dichlorobenzoyl)-4-N-butylphenylphosphine oxide. The amount of photoinitiator can be selected within wide limits, an amount of up to 0.05 g/g of prepolymer and preferably up to 0.003 g/g of prepolymer can be used. A person skilled in the art will know well how to select the appropriate photoinitiator. Examples of thermal initiators include, but are not limited to, 2,2'-azobis(2,4-dimethylpentanenitrile), 2,2'-azobis(2-methylpropanenitrile), 2,2'-azobis(2-methylbutanenitrile), azobisisobutyronitrile (AIBN), peroxides such as benzoyl peroxide, and the like.

In some aspects, the lens-forming material can further include a UV-absorber, a tinting agent, an antimicrobial agent, an inhibitor, a filler or any combination thereof. In one aspect, the ultraviolet absorber can include, for example, a benzotriazole or a benzophenone. Many benzotriazole and benzophenone UV absorbers are known and many are commercially available. The identity of the benzotriazole or benzophenone UV absorber is not critical, but should be selected based on its characteristic UV cut-off to give the desired UV absorbing property.

In general, the lens-forming materials and other components are mixed together in a solvent prior to introduction into the mold. Examples of suitable solvents are water, alcohols (e.g., lower alkanols having up to 6 carbon atoms, such as ethanol, methanol, propanol, isopropanol), carboxylic acid amides (e.g., dimethylformamide), dipolar aprotic solvents (e.g., dimethyl sulfoxide or methyl ethyl ketone), ketones (acetone or cyclohexanone), hydrocarbons (e.g., toluene), ethers (e.g., THF, dimethoxyethane or dioxane), and halogenated hydrocarbons (e.g., trichloroethane), and any combination thereof. The use of water alone or in combination with other solvents can be used herein. For example, the aqueous solution of the lens-forming materials can also include, for example an alcohol, such as methanol, ethanol or n- or isopropanol, or a carboxylic acid amide, such as N,N-dimethylformamide, or dimethyl sulfoxide. In one aspect, the aqueous solution of the lens-forming materials contains no further solvent.

In some aspects, the lens-forming material as described above is poured into a mold with a specific shape and size. When the ocular device is a contact lens, the lens can be produced using techniques known in the art. For example, the contact lens can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810.

Lens molds for making contact lenses are well known in the art. For example, a mold (for full cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the lens-forming material.

Methods of manufacturing mold sections for cast-molding a contact lens are generally well known to those of ordinary skill in the art. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002, which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz glass and sapphire.

Once the lens-forming material is poured into the mold, the lens-forming material is cured (i.e., polymerized) to produce a polymeric matrix and ultimately the lens. The techniques for conducting the polymerization step will vary depending upon the selection of the lens-forming material. In one aspect, when the lens-forming material comprises a prepolymer comprising one or more actinically-crosslinkable ethylenically unsaturated groups, the mold containing the admixture can be exposed to a spatial limitation of actinic radiation to polymerize the prepolymer. In other aspects, the mold containing the lens forming material can be subjected to heat in order to cure the lens-forming material.

In other aspects, the energy used to cure the lens-forming material is in the form of rays directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, UV radiation, visible light, gamma radiation, electron radiation or thermal radiation, the radiation energy preferably being in the form of a substantially parallel beam in order on the one hand to achieve good restriction and on the other hand efficient use of the energy.

In one aspect, the mold containing the lens-forming material is exposed to light having a wavelength greater than 300 nm, greater than 310 nm, greater than 320 nm, greater than 330 nm, greater than 340 nm, greater than 350 nm, greater than 360 nm, greater than 370 nm, or greater than 380 nm. Cut-off filters known in the art can be used to filter and prevent specific wavelengths of energy from contacting the mold and lens-forming material. The time the lens-forming mixture is exposed to the energy is relatively short, e.g. in less than or equal to 150 minutes, in less than or equal to 90 minutes, in less than or equal 60 minutes, less than or equal to 20 minutes, less than or equal to 10 minutes, less than or equal to 5 minutes, from 1 to 60 seconds, or from 1 to 30 seconds.

The methods described herein increase the ion permeability of an ophthalmic lens without adversely affecting other properties of the lens. For example, as demonstrated in the Examples, the lens' water content and oxygen permeability remain essentially the same when one or more polyethylene glycol methacrylate are used to produce the lens vs. the control lens without a compound having the formula I. In one aspect, the lens has a water content from 30% to 37%. In another aspect, the lens has an oxygen permeability greater than 70. Additionally, the use of polyethylene glycol methacrylate result in the formation of clear lenses, which is another important feature. In one aspect, depending on the composition of the silicone hydrogel formulation, the preferred water content of the lens is from 20% to 50%, with an oxygen permeability greater than 70.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Oxygen Permeability Measurements.

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H.D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

Where J=oxygen flux [microliters $O_2$/$cm^2$-minute]
$P_{oxygen}$=($P_{measured}$−$P_{water}$ vapor)=(% $O_2$ in air stream) [mm Hg]=partial pressure of oxygen in the air stream
$P_{measured}$=barometric pressure (mm Hg)

$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)

$Dk_{app}$ is expressed in units of barrers.

The oxygen transmissibility (Dk/t) of the material may be calculated by dividing the oxygen permeability ($Dk_{app}$) by the average thickness (t) of the lens.

The following additives are evaluated (Table 1): (1) PEG-MA2080/H$_2$O at 0.5% or 0.75% when using 1-propanol as solvent. (2) Mixtures: a: 0.5% PEG-MA 2080/H$_2$O and 2% PEG-MA1100; b: 0.75% PEG-MA 2080/H$_2$O and 1% PEG-MA1100; c: 0.75% PEG-MA 2080/H$_2$O and 1% PEG-MA526. At 0.75%, the freeze dried PEG-MA2080 leads to cloudy formulation. The formulation can be cleared up by warming up to 50° C., but the lenses are still cloudy.

TABLE 1

|   | PEG-MA 526 | PEG-MA 1100 | PEG-MA 2080 | Water | formulation | Lens |
|---|---|---|---|---|---|---|
| 1 |   |   | 0.5% or 0.75% | 0.5% or 0.75% | clear | clear |
| 2 |   |   | 1% | 1% | cloudy | hazy |
| 3 |   | 3% |   |   | clear | clear |
| 4 |   | 4% |   |   | cloudy | hazy |
| 5 |   | 1% | 0.75% | 0.75% | clear | clear |
| 6 |   | 2% | 0.5% | 0.75% | clear | clear |
| 7 |   | 3% | 0.75% | 0.75% | cloudy | hazy |
| 8 | 1% |   | 0.75% | 0.75% | clear | clear |

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Example 1

A silicone hydrogel lens formulation, formulation A, is composed of about 33% of chain-extended polydimethylsiloxane (CE-PDMS), 19% TRIS-methacrylamide (TRIS-MA), 23% dimethylacrylamide (DMA), 0.5% 2-hydroxy-2-methyl-1-phenyl-1-one (Darocur 1173) and 24.5% 1-propanol (1-PrOH). A small amount of N-(carbonyl-methyoxypolyethylene glycol-2000)-1,2-disteearoyl-sn-glycero-3-phosphoethanolamine, sodium salt (L-PEG-2000) may also be added.

Formulation A is made by the following procedure. For lightstream (LS) lens casting, L-PEG-2000 and 1-propanol are mixed first. After vortexing for 3 minutes in the Mini Vortexer, CE-PDMS, TRIS-MA, DMA and Darocur 1173 are added. For DSM lens casting, no L-PEG-2000 is used in the formulation. The bottle is placed on a roller (model No LJRM, PAULO ABBE) and rolled slowly for about 2 hours before the formulation is used for making lenses.

Example 2

Preparation of Silicone Hydrogel Contact Lens from Formulation A with PEG-MA

Formulation A modified with PEG additives is studied. Experiments are carried out to study the maximum percentage of polyethylene glycol methacrylate (PEG-MA) or PEG-MA mixture having different molecular weights that can be incorporated into formulation A while still achieving clear lenses. PEG-MA 2080 (Mw 2080, 50% in water) and PEG-MA 1100 are purchased from Aldrich-Sigma and used as received. The composition of the lens formulations are shown in Table 1. Lenses are prepared by using the full-cast molding of a lens formulation in polypropylene molds under UV irradiation (Philips F20T12 bulb, an intensity of 5.4 mW/cm$^2$ (measured by IL 1700 radiometer), curing time is 10 min).

Example 3

Some clear formulations, as listed in Table 2, are chosen for a more detailed study of lens properties. An unexpected high ion permeability (IP) value of above 10 for lenses produced with the PEG additive is observed. A control lens without PEG-MA is made and had an IP value of 4.9.

The Dk values are similar between lenses with or without PEG additives.

TABLE 2

| Formulation | PEG-MA 1100 | PEG-MA 2080 | Water (come from PEG-MA 2080) | Formulation observation | Lens casting* | IP | Dk |
|---|---|---|---|---|---|---|---|
| A |   | 0.75% | 0.75% | Clear | LS | 10.3 | 88 |
| A | 1% | 0.75% | 0.75% | Clear | LS | 14.6 | 83 |
| A-control |   |   |   | clear | LS | 4.9 | 88 |

*Mold: GLASS-mold: light Stream (LS) cure with 330 nm cut off filter, Intensity: 4 mw/cm$^2$; Curing time = 110 sec.

Example 4

Contact lenses with high IP can be obtained from a lens formulation including a PEG additive using double sided molding (DSM) process. As listed in Table 3, unexpected high IP values are also observed for the lenses cured by the DSM curing process using poly(cycloalkylenedialkylene terephthalate) (PCTA) molds at a light intensity of 5.4 mW/cm$^2$ (measured by IL1700 radiometer) with Philips F20T12 bulb for about 10 minutes. Lens formulations (formulation A) containing 0.75% PEG-MA2080 or 1% PEG-MA1100+0.75% PEG-MA2080, yielded much higher IP values.

TABLE 3

| Formulation/Lens Description | Additive | IP | H$_2$O Content (% by weight) | Dk |
|---|---|---|---|---|
| A-control |   | 7.45 | 34 | 89 |
| A | 1% PEG-MA1100 | 10.4 | 33 | 89 |

TABLE 3-continued

| Formulation/Lens Description | Additive | IP | H₂O Content (% by weight) | Dk |
|---|---|---|---|---|
| A | 0.75% PEG-MA2080 | 10.4 | 30 | 85 |
| A | 1% PEG-MA1100 + 0.75% PEG-MA2080 | 12.6 | 37 | 86 |

Example 5

Formulation B with PEG Additives

Formulation B is prepared by using the same procedure as formulation A, except that the TRIS-methacrylamide used in formulation A is replaced with TRIS-acrylamide in formulation B. Lenses with PEG additives are made from formulation B with one or two additives: 0.75% PEG-MA2080 and 0.75% PEG-MA2080 plus 1% E0-PO-MA. EO-PO is a copolymer of ethylene oxide and propylene oxide. The IP value increased from about 8.7 (control-no PEG) to 13.1 or 15.1 (with PEG), while the Dk remained unchanged.

TABLE 4

| Formulation/Lens Description | Additive | Molds, cure time* | IP | Dk |
|---|---|---|---|---|
| B-control | | LS-glass | 8.7 | 88.9 |
| B | 0.75% PEG-MA2080 | LS-glass | 13.3 | 89.3 |
| B | 1% EO-PO-Ma + 0.75% PEG-MA2080 | LS-glass | 15.1 | 92.8 |

*Mold: GLASS-mold: light Stream (LS) cure with 330 nm cut off filter, Intensity: 4 mw/cm²; Curing time = 110 sec.

The compatibility of PEG-MA is investigated. The lenses are made by DSM curing process using PP molds. IP values are provided in Table 5. 1.5% and 2% PEG-MA2080 resulted in the formation of cloudy formulations C and D. If PEG-MA1100 is used in formulations C and D, the maximum percentage amount of PEG additive that can be used before the formulation becomes cloudy is 10% and 13.8%, respectively. If the mixture of PEG-MA2080 and PEG-MA1100 is used, when 0.75% PEG-MA2080 is used, it is desirable that the percentage of PEG-MA1100 not be higher than 8% in either of formulations C and D.

TABLE 5

| Formulation/Lens Description | Additive | Molds | Cure time | IP | Dk |
|---|---|---|---|---|---|
| C | | PP | 30 min | 6 | 75 |
| C | 1% PEG-MA MW 1100 + 0.75% PEG-MA MW2080 | PP | 30 min | 9.1 | 70 |
| D | | PP | 30 min | 3.7 | 76 |
| D | 1% EO-PO-MA + 0.75% PEG-MA2080 | PP | 30 min | 7.2 | 75 |

Double side curing using PP molds at the intensity of 5.4 mW/cm² (measured by IL1700 radiometer) with Philips F20T12 bulb. Curing time is 30 min.

Example 7

In this example, the impact of PEG additive on IP values is studied using lenses coated with methane-air rotary plasma coating. As shown in Table 6, except for one condition, IP values increased for lenses with the PEG additive. The IP value increase is statistically significant at 95% confidence level (based on one-way ANOVA analysis).

TABLE 6

| | Ion Permeability | | | | |
|---|---|---|---|---|---|
| Lens No. Molds used | Control PP | 1% PEG1100 PP | 0.75% PEG 2080PP PP | 0.75% PEG 2080PCTA PCTA | 1% PEG1100 + 0.75% PEG2080 PP |
| 1 | 2.86 | 5.86 | 5.1 | 6.22 | 5.99 |
| 2 | 3.64 | 5.53 | 3.25 | 6.56 | 5.99 |
| 3 | 4.44 | 6.25 | 4.3 | 6.28 | 4.35 |
| 4 | 4.51 | 6.08 | 4.25 | 7.44 | 5.18 |
| 5 | 3.55 | 5.54 | 4.87 | 6 | 5.64 |
| 6 | 4.31 | 6.57 | 4.02 | 7.31 | 5.69 |
| 7 | 3.92 | 5.39 | 2.97 | 7.33 | 4.61 |
| 8 | 4.3 | 4.82 | 3.74 | 6.3 | 5.72 |
| Average | 3.94 | 5.76 | 4.06 | 6.68 | 5.40 |
| STD | 0.57 | 0.55 | 0.73 | 0.58 | 0.62 |

Example 6

Formulation C is prepared from 25.92% Betacon, 19.25% TRIS-methacrylate, 28.88% dimethylacrylamide (DMA), 1% 2-hydroxy-2-methyl-1-phenyl-1-one (Darocur 1173) and 24.95% ethanol. Formulation D is prepared from 18.44% Betacon, 27.05% TRIS-methacrylate, 29.51% dimethylacrylamide (DMA), 0.8% 2-hydroxy-2-methyl-1-phenyl-1-one (Darocur 1173) and 24.2% ethanol.

Example 8

In this example, the impact of PEG additive on IP value is studied using lenses coated with methane-air linear plasma coating or methane-nitrogen linear plasma coating. As listed in Table 7 and Table 8, IP values increased for lenses having PEG additive. For most of the conditions, the IP value increase is statistically significant at 95% confidence level.

TABLE 7

| | | | | 1% PEG- |
| Lens No.* | Control | 1% PEG-MA1100 | 3% PEG-MA1100 | MA1100 + 0.75% PEG-MA2080 |
| --- | --- | --- | --- | --- |
| 1 | 4.99 | 5.01 | 6.65 | 4.92 |
| 2 | 4.57 | 3.59 | 8.16 | 6.9 |
| 3 | 4.73 | 5.37 | 7.90 | 7.09 |
| 4 | 4.63 | 5.02 | 7.71 | 6.87 |
| 5 | 4.88 | 7.72 | 6.48 | 5.69 |
| 6 | 4.33 | 3.80 | 7.45 | 5.19 |
| 7 | 4.37 | 6.99 | 7.59 | 5.58 |
| 8 | 4.75 | 4.73 | 6.06 | torn |
| 9 | Na | Na | Na | 6.09 |
| AVG | 4.66 | 5.28 | 7.25 | 6.04 |
| STD | 0.23 | 1.43 | 0.75 | 0.83 |

*Methane-nitrogen plasma coating.

TABLE 8

Ion Permeability

| Lens No.* | Control | 1% PEG-MA1100 | 3% PEG-MA1100 values | 1% PEG-MA1100 + 0.75% PEG-MA2080 |
| --- | --- | --- | --- | --- |
| 1 | 4.11 | 4.32 | 5.81 | 5.43 |
| 2 | 4.25 | 3.24 | 6.42 | 5.34 |
| 3 | 4 | 4.00 | 6.61 | 4.92 |
| 4 | 4.52 | 3.24 | 5.80 | 3.49 |
| 5 | 4.49 | 6.53 | 6.86 | 4.66 |
| 6 | 4.28 | 3.67 | 6.44 | 5.11 |
| 7 | 4.34 | 6.56 | 5.83 | 3.57 |
| 8 | 3.99 | 6.86 | 6.68 | 4.17 |
| AVG | 4.25 | 4.80 | 6.31 | 4.59 |
| STD | 0.20 | 1.57 | 0.43 | 0.76 |

*methane-air linear plasma coating

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A method for increasing the ion permeability of a silicone hydrogel contact lens, the method comprising:
    a. introducing into a mold a lens-forming material, wherein the lens-forming material comprises (i) at least one silicone-containing vinylic monomer or macromer, (ii) at least one hydrophilic vinylic monomer, (iii) two ion-permeability-enhancing vinylic monomers or macromers which are two polyethylene glycol methacrylates which have a polyethylene glycol chain having a molecular weight of 500 to 2,500 and are different from each other in molecular weight, wherein each of the two polyethylene glycol methacrylates is obtained by reacting a monofunctional terminated polyethylene glycol having one first functional group selected from the group consisting of amino, hydroxyl, acid chloride, and epoxy group at one terminus and a methoxy or ethoxy group at the other terminus of the monofunctional terminated polyethylene glycol, with a vinylic monomer having a second functional group coreactive with the first functional group and selected from the group consisting of isocyanate, amino, epoxy, hydroxyl, acid chloride, azlactone, and thiol group; and a crosslinking agent from about 0.05% to about 4% by weight
    b. curing the lens-forming material to produce the lens; and
    c. removing the lens from the mold, wherein the two polyethylene glycol methacrylates are present from about 0.5% to about 2.5% by weight and sufficient to provide the resultant lens with an increased ion permeability compared to a control lens while not significantly altering the water content
    and the oxygen permeability of the resultant lens as characterized by having changes in water content and oxygen permeability being less than about 8% relative to the control lens, wherein the control lens is produced from a control formulation having identical concentrations of all polymerizable components but without any polyethylene glycol methacrylate, wherein the lens has an ion permeability that is at least 40% greater than the control lens.

2. The method of claim 1, wherein the silicon-containing vinylic monomer comprises N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl](meth)acrylamide, N-[tris(dimethylethylsiloxy)silylpropyl](meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)-propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)-silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl] propyl vinyl carbonate, t-butyldimethyl-siloxyethyl vinyl carbonate; trimethylsilylethyl vinyl carbonate, and trimethylsilylmethyl vinyl carbonate), or any combination thereof.

3. The method of claim 1, wherein the silicon-containing vinylic macromer comprises a monomethacrylated or monoacrylated polydimethylsiloxane; a dimethacrylated or diacrylated polydimethylsiloxane; a vinyl carbonate-terminated polydimethylsiloxane; a vinyl carbamate-terminated polydimethylsiloxane; a vinyl terminated polydimethylsiloxane; a methacrylamide-terminated polydimethylsiloxane; an acrylamide-terminated polydimethylsiloxane; an acrylate-terminated polydimethylsiloxane; a methacrylate-terminated polydimethylsiloxane; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; a polysiloxanylalkyl(meth)acrylic monomer, or any combination thereof.

4. The method of claim 1, wherein the hydrophilic vinylic monomer comprises a hydroxyl-substituted lower alkyl ($C_1$ to $C_3$) (meth)acrylate, a hydroxyl-substituted lower alkyl vinyl ether, a $C_1$ to $C_3$ alkyl(meth)acrylamide, a di-($C_1$-$C_3$ alkyl)(meth)acrylamide, an N-vinylpyrrole, an N-vinyl-2-pyrrolidone, a 2-vinyloxazoline, a 2-vinyl-4,4'-dialkyloxazolin-5-one, a 2- and 4-vinylpyridine, amino(lower alkyl), a mono(lower alkylamino)(lower alkyl) and di(lower alkylamino)(lower alkyl)(meth)acrylate, an allyl alcohol, an N-vinyl $C_1$ to $C_3$ alkylamide, an N-vinyl-N—$C_1$ to $C_3$ alkylamide, or any combination thereof.

5. The method of claim 1, wherein the hydrophilic vinylic monomer comprises N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, N-vinyl formamide, N-vinyl acetamide, N-vinyl isopropylamide, N-vinyl-N-methyl acetamide, allyl alcohol, N-vinyl caprolactam, or any combination thereof.

6. The method of claim 1, wherein the lens-forming material further comprises a hydrophobic monomer.

7. The method of claim 6, wherein the hydrophobic monomer comprises methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, or any combination thereof.

8. The method of claim 1, wherein the crosslinker comprises tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy) disiloxane, N,N'-methylenebisacrylamide, N,N'-methylenebismethacrylamide, N,N'-ethylenebisacrylamide, N,N'-ethylenebismethacrylamide,1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis(trimethylsiloxy)disiloxane, 1,3-bis(methacryloxyethylureidopropyl)-1,1,3,3-tetrakis(trimethylsiloxy)disiloxane, and combinations thereof.

9. The method of claim 1, wherein the lens-forming material further comprises a polymerization initiator, a UV-absorber, a tinting agent, an antimicrobial agent, an inhibitor, a filler, or any combination thereof.

* * * * *